Oct. 11, 1938.    W. C. SANDERS    2,133,230

AXLE BEARING SEAL

Filed Aug. 12, 1937

INVENTOR:
Walter C. Sanders

HIS ATTORNEYS.

Patented Oct. 11, 1938

2,133,230

UNITED STATES PATENT OFFICE 2,133,230

AXLE BEARING SEAL

Walter C. Sanders, Canton, Ohio, assignor to The Timken Roller Bearing Company, Canton, Ohio, a corporation of Ohio Application August 12, 1937, Serial No. 158,672

1 Claim. (Cl. 286—5)

My invention relates to axle bearing seals for the retaining of lubricant in bearing housings and the exclusion of water and other foreign matter therefrom. The invention has for its principal object an axle bearing seal which is simple in construction, which eliminates the necessity for delicate packing members, which is able to withstand the most severe service conditions, particularly conditions where the bearing seal is exposed to water and which effectively retains lubricant in the housing and excludes water and other foreign matter therefrom.

The invention consists principally in the axle bearing seal construction and in the parts and combinations and arrangements of parts hereinafter described and claimed.

Figure 1:
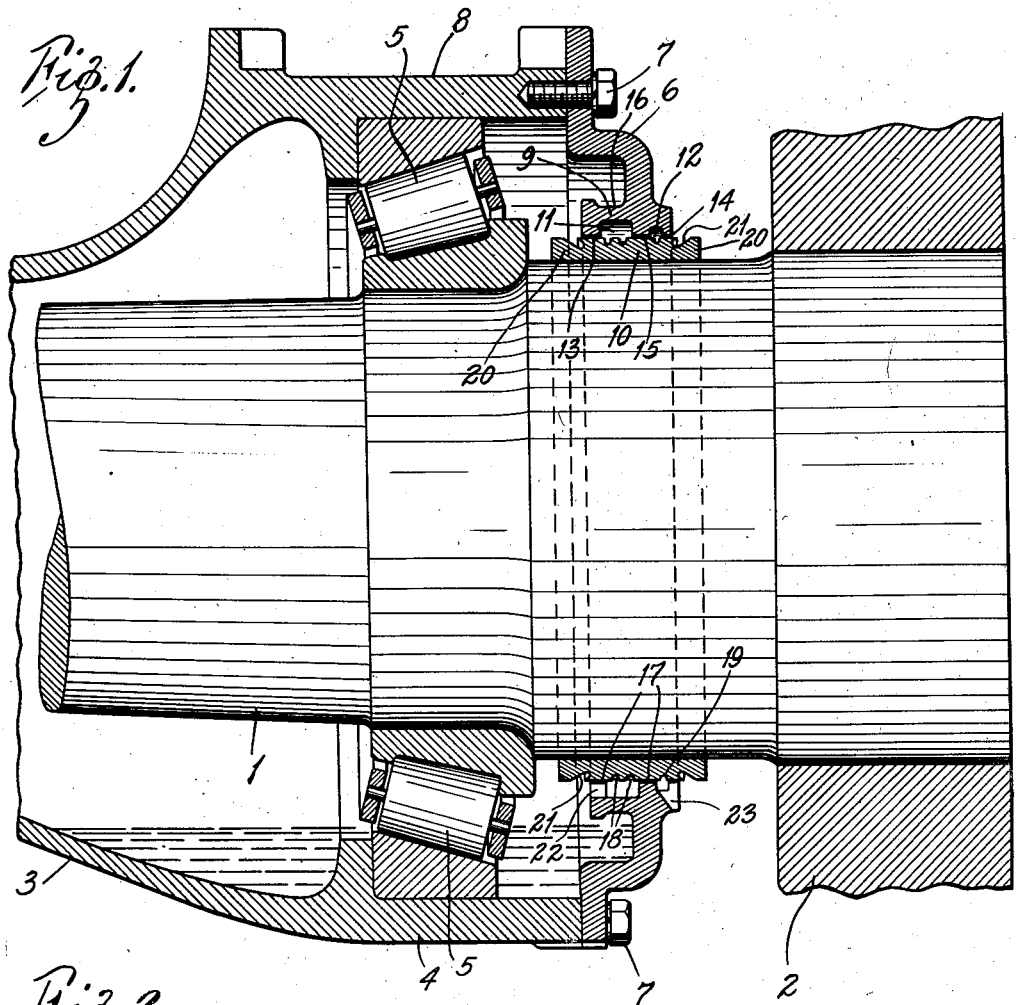
Figure 2:
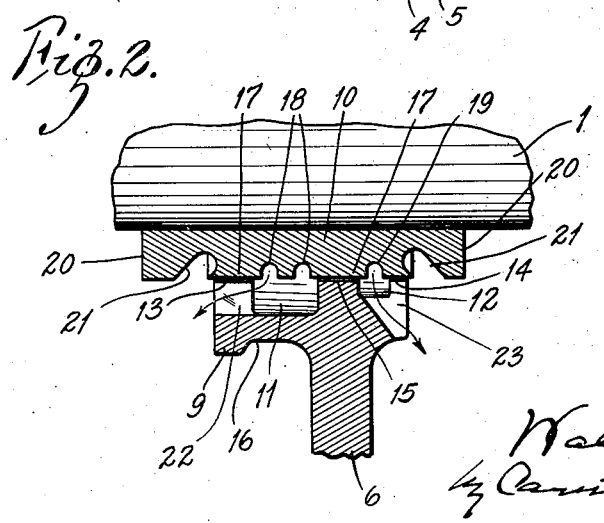

In the accompanying drawing,

Fig. 1 is a longitudinal sectional view of a railway car axle bearing having a seal construction embodying my invention; and Fig. 2 is an enlarged longitudinal sectional view of the bearing seal and its immediately associated parts.

In the drawing is illustrated a railway car axle 1 having a wheel 2 mounted thereon (a portion only of the wheel being shown in the drawing) and an axle housing 3 whose end portion 4 constitutes a bearing housing, a taper roller bearing 5 being interposed between the axle and the bearing housing. The end of the bearing housing 4 is spaced from the wheel hub 2 and an annular cover plate 6 is secured to the end of the housing, as by screws 7. The outer surface 8 of the bearing housing is shaped to cooperate with suitable truck frame members (not shown). It will be understood that the construction illustrated will be duplicated at the other end of the axle.

Said annular cover plate 6 has an axially extending tubular inner peripheral portion 9 which cooperates with a sleeve 10 mounted on said axle 1 between the end of the bearing 5 and the wheel hub 2. Said sleeve 10 and said tubular portion 9 of said cover plate 6 constitute the seal forming the subject matter of the present invention.

The tubular portion 9 of said cover plate 6 has a relatively large annular groove 11 around its inner periphery, in the portion thereof that projects inwardly from the cover plate 6 proper toward the bearing 5. Said tubular portion 9 has a smaller annular groove 12 around its inner periphery near the outermost end portion (i. e. nearest the wheel hub). The innermost end portion 13 and the outermost end portion 14 of the bore of the tubular member are cylindrical and the intermediate portion 15 between the two grooves is likewise cylindrical. A gutter 16 may be formed on the outer surface of said tubular portion 9.

Said sleeve 10 has cylindrical portions 17 that are closely encircled respectively by the cylindrical end portions 13, 14 and the cylindrical intermediate portion 15 of the bore of said tubular portion 9 of said cover plate 6. Said sleeve 10 has two annular peripheral grooves 18 communicating with said enlarged groove 11 and an annular groove 19 communicating with said small groove 12.

The ends 20 of the sleeve project beyond the end of the tubular portion 9 of the cover plate 6. In each end portion is a peripheral groove 21 of angular section, said grooves facing away from the ends of the tubular portion 9. That is, one groove 21 is disposed with its opening facing the bearing 5 and the other groove 21 with its opening facing the wheel hub 2.

The innermost end of the tubular portion 9 of the cover plate 6 is provided at its low point with a slot 22 therethrough, opening into the bearing housing 4. The outermost end is provided with a slot 23 at its low point opening to the outside.

Any lubricant that is caught in the innermost angular groove 21 is thrown toward the end of the bearing 5 by the action of centrifugal force and the angular shape of the groove. Water entering the outermost angular groove 21 is similarly thrown away from the cover plate 6 and toward the wheel hub 2. The close fit between the innermost cylindrical portion 13 of the tubular member and the cooperating cylindrical portion 17 of the sleeve 10 substantially prevents seepage of oil along the sleeve. Any oil that does work its way along the sleeve is collected by the two annular peripheral grooves 18 and will then be thrown by centrifugal force into the large annular groove 11, whence it will drain downwardly and through the slot 22 back into the bearing housing. Any oil in the two annular grooves 18 when the axle stops rotating will drain down said grooves into the large groove 11 of the cover plate and through the slot 22 into the bearing housing 4.

Similarly, any water that may work its way along the sleeve 10 from the outside is caught by the annular groove 19 and is thrown by centrifugal force into the annular groove 12 in the cover plate, where it drains downwardly and then to the outside through the slot 23.

The above described construction effectively retains lubricant in the housing of an axle bearing and the like and prevents water from entering the bearing housing from the outside. The seal is thus desirable for use with railway car axle bearings, which are continually exposed to water, both under some running conditions and when the cars and trucks are being washed. The construction eliminates expensive and delicate packings, being made entirely of simple metal parts.

Obviously changes may be made in the grouping and arrangement of the several grooves and other changes may be made without departing from the invention, so that I do not wish to be limited to the precise construction shown.

What I claim is:

An axle bearing seal construction comprising an axle, a stationary housing, a closure ring for said housing having an axially extending tubular inner peripheral portion, said tubular portion having two annular recesses around its bore, cylindrical end portions and a cylindrical middle portion, and a sleeve on said axle cooperating with said tubular portion, the ends of said sleeve extending beyond said tubular portion, each end of said sleeve having an angular groove in its outer periphery facing away from the end of said tubular portion, said sleeve having cylindrical portions closely encircled by the respective cylindrical portions of said tubular portion of said ring and also having annular peripheral grooves communicating with the respective grooves of said tubular portion, said tubular portion of said ring also having slots in the ends of its lowermost portion, one for returning to the bearing housing lubricant that may creep along said sleeve to the groove disposed nearer the housing and the other for returning to the outside water that may work its way along said sleeve to the groove nearer the outside.

WALTER C. SANDERS.